US006201042B1

(12) United States Patent
Kaye et al.

(10) Patent No.: US 6,201,042 B1
(45) Date of Patent: Mar. 13, 2001

(54) METHOD OF MAKING MICROSPHERE ADHESIVE

(76) Inventors: Howard B. Kaye, 233 Scott Ave., Syracuse, NY (US) 13224; David K. Holbrook, 851 Glenwood Ave., Syracuse, NY (US) 13207; Brian M. Vogler, 409 Snyder Ave., Syracuse, NY (US) 13206

( * ) Notice: Subject to any disclaimer, the term of this patent is extended or adjusted under 35 U.S.C. 154(b) by 0 days.

(21) Appl. No.: 09/300,615

(22) Filed: Apr. 27, 1999

(51) Int. Cl.[7] ............... B05D 5/10; C08K 7/16; C08K 7/22; C08L 1/28
(52) U.S. Cl. .......... 523/223; 523/334; 524/45; 524/378; 524/832; 528/499; 427/208.4
(58) Field of Search .................. 523/223, 334; 524/45, 378, 832; 528/499; 427/208.4

(56) References Cited

U.S. PATENT DOCUMENTS

| 4,495,318 | 1/1985 | Howard . |
| 4,598,120 | * 7/1986 | Thoma et al. .............. 524/837 |
| 5,877,252 | * 3/1999 | Tsujimoto et al. .......... 524/832 |

FOREIGN PATENT DOCUMENTS

97/14510   4/1997   (WO) .

* cited by examiner

*Primary Examiner*—Tae Yoon
(74) *Attorney, Agent, or Firm*—Charles J. Brown, Esq.

(57) ABSTRACT

In a method of making repositionable pressure sensitive adhesive of tacky elastomeric microspheres wherein the microspheres are polymerized and formed in an aqueous suspension which includes a surfactant, a certain amount of the surfactant is removed from the aqueous suspension after completion of polymerization of the microspheres so that a predetermined reduced amount of surfactant remains, with the result that migration of the surfactant from the adhesive is at least substantially reduced.

7 Claims, No Drawings

METHOD OF MAKING MICROSPHERE ADHESIVE

BACKGROUND OF THE INVENTION

There has been considerable development over the last twenty years in the design and manufacture of repositionable adhesives, specifically in methods of making inherently tacky, elastomeric, solvent insoluble, solvent dispersible polymeric microspheres. These microspheres, either solid or hollow, are typically combined with appropriate binders and thickening agents to form adhesives which are coated by various methods on backing materials such as papers, films and foils.

Inherently tacky acrylic microspheres utilized in these adhesive compositions are produced by suspension polymerization methods which have become quite common. In all of these techniques surfactants are used to stabilize the microspheres in the suspension polymerization process. Following the polymerization process, additional wetting agents or surfactants are often added to increase the wetting ability of the microsphere composition on support surfaces. For example, Tsujimoto Patent WO97/14510 describes a transfer coatable water based microsphere adhesive composition for sheet-to-sheet coating processes. It teaches that a surfactant, in addition to surfactant within the polymeric microsphere composition itself and its binders and thickening agents, is added during the manufacture of the adhesive composition to enhance wetting on a silicon surface. This is a well known practice.

However, the addition of wetting agents or surfactants to microsphere compositions in adhesive manufacture is not without disadvantages. The wetting agent or surfactant may migrate from the finished product if present in excessive amounts. In transfer coating processes, the tack and peel of the adhesive microsphere compositions can be diminished by wetting agents or surfactants in too great an amount. Also, typical wetting agents such as fluorosurfactants and specialty diols are quite expensive.

It is the purpose of the present invention to improve upon methods of making repositionable pressure sensitive adhesives in a manner such that surfactants are not added to the microsphere compositions as in the Tsujimoto reference and those surfactants present in the microsphere composition or its binders or thickening agents are significantly reduced. By achieving these objects, migration of wetting agent from the finished products is greatly lessened if not eliminated, the inherent tack and peel of the adhesive microsphere compositions are increased and use of expensive added wetting agents such as fluorosurfactants and specialty diols is avoided.

SUMMARY OF THE INVENTION

The improvement of the invention is in the manufacture of repositionable pressure sensitive adhesive of tacky elastomeric microspheres wherein the microspheres are polymerized and form in an aqueous suspension which includes a surfactant. The improvement comprises removing a certain amount of surfactant from the aqueous suspension after completion of polymerization of the microspheres so that a predetermined reduced amount of surfactant remains. Thereafter a thickening agent is added to the aqueous suspension. As a consequence of this removal of surfactant, migration of the surfactant from the adhesive is at least substantially reduced.

The aqueous suspension in which the polymerized microspheres are formed preferably is partly of solids. In a specific form of the method of the invention a wash liquid is added to the aqueous suspension so that some of the surfactant transfers to the wash liquid. The wash liquid is removed along with the transferred surfactant. to leave an aqueous suspension of a greater amount of solids and a lesser amount of the surfactant.

This addition and removal of the wash liquid may be repeated until the desired predetermined reduced amount of surfactant remains in the suspension.

A preferred form of the surfactant is ethoxylated oleyl alcohol. The predetermined reduced amount of this preferred surfactant in the aqueous suspension is 0.028 percent to 0.133 percent by weight on a mass basis of both solids and liquid before addition of the thickening agent and 0.020 percent to 0.093 percent by weight on a mass basis of both solids and liquid after addition of the thickening agent.

The repositionable pressure sensitive adhesive made in accordance with the invention may be coated on a release sheet which is then laminated to paper stock to form labelstock. The microspheres are preferably of an average particle diameter of 20 to 60 microns and they may be either solid or hollow. The thickening agent may be a sodium carboxy methyl cellulose based slurry.

DESCRIPTION OF PREFERRED EMBODIMENT

Key to the method of the invention is that a substantial amount of the surfactant present during the polymerization of the microspheres is removed after polymerization is completed. As noted, this removal of surfactant is accomplished by separation of the microsphere suspension followed by decantation to increase the percentage of solids in the suspension. This is then repeated with additional dilution of the microsphere suspension and further decantation until a desired predetermined reduced surfactant level is achieved. The resulting adhesive composition may be coated on a release sheet which is laminated to paper stock to form lablestock or it can be used in a sheet-to-sheet coating process as described in the aforementioned patent to Tsujimoto.

In a preferred form of the method of the invention the elastomeric microspheres, either solid or hollow, have an average particle diameter of 20 to 60 microns. The preferred surfactant is ethoxylated oleyl alcohol. From one to six washings each followed by phase separation reduces the amount of surfactant in the microspheres to the desired level. That level is from 0.028 percent to 0.133 percent by weight on a mass basis of both solids and liquid before the final addition of a thickening agent and 0.020 percent to 0.093 percent by weight on a mass basis of both solids and liquid after addition of a thickening agent. A preferred form of thickening agent is an aqueous suspension of sodium carboxy methyl cellulose. The addition of such a thickening agent increases the bulk viscosity of the suspension to between 100 and 2,000 centipoise.

An example of the conventional microsphere polymerization process will now be described. It is very similar to that described in Howard U.S. Pat. No. 4,495,318.

To a three liter, three-neck flask equipped with thermometer, mechanical stirrer, reflux condenser and vacuum and nitrogen inlet tube, were added 1500 grams of deionized (or distilled) water and 3.36 grams of Carbopol 907 (polyacrylic acid of 300,000–500,000 molecular weight range commercially available from the B. F. Goodrich Co.) as a suspension agent. The contents of the flask were then mixed to dissolve the Carbopol 907. Concentrated ammonium hydroxide was then added to the mixture until a pH of 7.0 was achieved.

To the mixture was charged 12.0 grams of non-ionic surfactant sold by Rhodia Inc. under the trademark Rhodasurf ON-870 for ethoxylated oleyl alcohol which has an average of 20 moles of ethylene oxide. The surfactant was solid, with a softening point at 43° C., Color Gardner (molten) 2.0, and a flash point of 237° C.

The mechanical stirrer was then turned off and the flask was then charged with a mixture of 2.34 grams of benzoyl peroxide, 70% in water, commercially available from Aztec Peroxides, Inc., and 589.3 grams of 2-ethyl hexyl acrylate. Vacuum was then placed on the contents of the flask, the pressure therein being drawn to approximately 20 inches of mercury, and held for fifteen minutes to assure removal of dissolved air and oxygen. The vacuum was then broken with nitrogen. A nitrogen purge was maintained throughout the emulsion and polymerization process. Agitation for the mixture was set at 300 rpm.

The batch was then heated to 70° C. and maintained for 16 hours. As the temperature initially approached 65° C. a mild exotherm was noted which raised the temperature to approximately 80° C. After the 16 hour period the suspension was passed through a 250 micron screen. The resultant homopolymer contained approximately 28 percent solids. Upon standing, the polymer spheres creamed to the surface but were readily dispersed by agitating the mixture. Particle diameter ranged from 5 to 100 microns, with the average size approximately 35 microns.

The resultant polymerized microsphere suspension was comprised of 71.27 percent reverse osmosis/deionized water, 0.160 percent Carbopol 907, 0.57 percent Rhodasurf ON-870, and 28.00 percent 2-EHA, on a total mass basis.

In accordance with a first example of the invention the foregoing suspension was concentrated to 40 percent solids by phase separation. A total of 596.000 grams of the 40 percent solids concentrate and 404.000 grams of water as a wash agent were placed in a tank and mixed and phase separation was carried out after which 404.000 grams of liquid was removed from the tank. Thereafter a second addition of 404.000 grams of water was made to the tank followed by mixing and phase separation was carried out after which 602.667 grams of liquid was removed from the tank. This resulted in a suspension of 60 percent solids with the suspension agent Carbopol 907 as 0.050 percent and the surfactant Rhodasurf ON-870 as 0.177 percent of the liquid phase, respectively.

The final adhesive was then produced by mixing a thickening agent of a sodium carboxy methyl cellulose slurry of 1.18 percent sodium carboxy methyl cellulose powder and 98.82 percent water with this 60 percent solids suspension, so that on a total mass basis the 60 percent solid suspension comprised 70.000 percent, the water from the sodium carboxy methyl cellulose slurry was 29.646 percent and the sodium carboxy methyl cellulose itself was 0.0354 percent.

In a second example the suspension was concentrated to 42 percent solids by phase separation. A total of 600.000 grams of the 42 percent solids concentrate and 400.000 grams of water were transferred to a tank and mixed and phase separation was carried out after which 475 grams of liquid was removed from the tank. A second addition of 475 grams of water was then made to the tank followed by mixing and phase separation was carried out after which 580.000 grams of liquid was removed from the tank. The resulting suspension was 60 percent solids, with the suspension agent Carbopol 907 as 0.038 percent and the surfactant Rhodasurf ON-870 was 0.136 percent of the liquid phase, respectively.

In this second example the adhesive was produced by admixing a thickening agent of a sodium carboxy methyl cellulose slurry with the 60 percent solids suspension in the same compositions and amounts as in the first example.

The scope of the invention is to be determined by the following claims rather than by the foregoing description of a preferred embodiment.

What is claimed is:

1. In a method of making a repositionable pressure-sensitive adhesive of tacky elastomeric microspheres of an average particle diameter of 20 to 60 microns wherein the microspheres are polymerized and form an aqueous suspension partly of solids which includes a surfactant of ethoxylated oleyl alcohol, the improvement which comprises
   a) adding to the suspension wash water to which some of the surfactant transfers,
   b) removing the wash water along with the transferred surfactant to leave a suspension of a greater amount of solids and a lesser amount of said surfactant,
   c) repeating the addition and removal of the wash water until a predetermined reduced amount of surfactant remains in the suspension, and
   d) thereafter adding a thickening agent to said aqueous suspension,
   e) said predetermined reduced amount of said surfactant in the aqueous suspension is 0.028 percent to 0.133 percent by weight on a mass basis of both solids and liquid before addition of the thickening agent and 0.020 percent to 0.093 percent by weight on a mass basis of both solids and liquid after addition of the thickening agent,
   f) whereby migration of said surfactant from the adhesive is at least substantially reduced.

2. In a method of making a repositionable pressure-sensitive adhesive of tacky elastomeric microspheres wherein the microspheres are polymerized and form an aqueous suspension partly of solids which includes a surfactant, the improvement which comprises
   a) adding to the aqueous suspension a wash liquid to which some of the surfactant transfers,
   b) removing the wash liquid along with the transferred surfactant to leave an aqueous suspension of a greater amount of solids and a lesser amount of said surfactant,
   c) repeating the foregoing steps of adding and removing the wash liquid so that a predetermined reduced amount of surfactant remains in the suspension, and
   d) thereafter adding a thickening agent to said aqueous suspension,
   e) whereby migration of said surfactant from the adhesive is at least substantially reduced.

3. In a method of making a repositionable pressure-sensitive adhesive of tacky elastomeric microspheres wherein the microspheres are polymerized and form an aqueous suspension partly of solids which includes an ethoxylated oleyl alcohol surfactant, the improvement which comprises
   a) adding to the aqueous suspension a wash liquid to which some of the surfactant transfers,
   b) removing the wash liquid along with the transferred surfactant to leave an aqueous suspension of a greater amount of solids and a lesser amount of said surfactant so that a predetermined reduced amount of surfactant remains, and
   c) thereafter adding a thickening agent to said aqueous suspension, d) whereby migration of said surfactant from the adhesive is at least substantially reduced.

4. A method according to claim 3 wherein the predetermined reduced amount of said surfactant in the aqueous suspension is 0.028 percent to 0.133 percent by weight on a mass basis of both solids and liquid before addition of the thickening agent and 0.020 percent to 0.093 percent by weight on a mass basis of both solids and liquid after addition of the thickening agent.

5. In a method of making a repositionable pressure-sensitive adhesive of tacky elastomeric microspheres wherein the microspheres are polymerized and form an aqueous suspension partly of solids which includes a surfactant and the repositionable pressure sensitive adhesive is coated on a release sheet which is then laminated to paper stock to form lablestock, the improvement which comprises
 a) adding to the aqueous suspension a wash liquid to which some of the surfactant transfers,
 b) removing the wash liquid along with the transferred surfactant to leave an aqueous suspension of a greater amount of solids and a lesser amount of said surfactant so that a predetermined reduced amount of surfactant remains, and
 c) thereafter adding a thickening agent to said aqueous suspension,
 d) whereby migration of said surfactant from the adhesive is at least substantially reduced.

6. In a method of making a repositionable pressure-sensitive adhesive of tacky elastomeric hollow microspheres wherein the microspheres are polymerized and form an aqueous suspension partly of solids which includes a surfactant, the improvement which comprises
 a) adding to the aqueous suspension a wash liquid to which some of the surfactant transfers,
 b) removing the wash liquid along with the transferred surfactant to leave an aqueous suspension of a greater amount of solids and a lesser amount of said surfactant so that a predetermined reduced amount of surfactant remains, and
 c) thereafter adding a thickening agent to said aqueous suspension,
 d) whereby migration of said surfactant from the adhesive is at least substantially reduced.

7. In a method of making a repositionable pressure-sensitive adhesive of tacky elastomeric microspheres wherein the microspheres are polymerized and form an aqueous suspension partly of solids which includes a surfactant, the improvement which comprises
 a) adding to the aqueous suspension a wash liquid to which some of the surfactant transfers,
 b) removing the wash liquid along with the transferred surfactant to leave an aqueous suspension of a greater amount of solids and a lesser amount of said surfactant so that a predetermined reduced amount of surfactant remains, and
 c) thereafter adding a thickening agent of a sodium carboxy methyl cellulose based slurry to said aqueous suspension,
 d) whereby migration of said surfactant from the adhesive is at least substantially reduced.

* * * * *